US006135480A

United States Patent [19]

James

[11] Patent Number: 6,135,480

[45] Date of Patent: *Oct. 24, 2000

[54] WHEELCHAIR RECLINING APPARATUS

[76] Inventor: Norman E. James, 1610 W. Hickory Dr., Mahomet, Ill. 61853

[ * ] Notice: This patent issued on a continued prosecution application filed under 37 CFR 1.53(d), and is subject to the twenty year patent term provisions of 35 U.S.C. 154(a)(2).

[21] Appl. No.: 09/289,857

[22] Filed: Apr. 12, 1999

[51] Int. Cl.[7] .......... B62H 1/00

[52] U.S. Cl. .......... 280/304.1; 297/310; 297/391; 248/176.1

[58] Field of Search .......... 280/304.1; 414/678, 414/921; 297/326, 327, DIG. 4, 310, 391, 396; 248/158, 407, 188.5, 176.1

[56] References Cited

U.S. PATENT DOCUMENTS

| | | | |
|---|---|---|---|
| 482,520 | 9/1892 | Field | 297/310 |
| 3,287,040 | 11/1966 | Verticchio | 248/188.5 |
| 3,394,933 | 7/1968 | Benoit | 280/304.1 |
| 4,227,740 | 10/1980 | East | 297/DIG. 4 |
| 4,527,944 | 7/1985 | Qually et al. . | |
| 4,561,823 | 12/1985 | Norton . | |
| 4,653,808 | 3/1987 | Opsvik | 248/188.5 |
| 4,834,411 | 5/1989 | Willey et al. . | |
| 5,007,118 | 4/1991 | Ebersole . | |
| 5,044,647 | 9/1991 | Patterson . | |
| 5,135,191 | 8/1992 | Schmuhl | 280/304.1 |
| 5,265,689 | 11/1993 | Kauffmann | 297/DIG. 4 |
| 5,308,028 | 5/1994 | Kornberg | 280/304.1 |
| 5,421,693 | 6/1995 | Peterson . | |
| 5,618,055 | 4/1997 | Mulholland | 297/DIG. 4 |
| 5,865,504 | 2/1999 | Warhaftig . | |

*Primary Examiner*—Daniel G. DePumpo
*Attorney, Agent, or Firm*—Berns Law Office Michael Berns

[57] ABSTRACT

This invention relates to an apparatus and method for supporting the back of a wheelchair having a person siting in the wheelchair, when the wheelchair is tilted backwards. The apparatus consists of a base, stand, and crossbar for engaging the frame of the wheelchair. The frame of the wheelchair is supported near its handles by the crossbar of the invention, allowing some mobility in the wheelchair resting on the invention.

11 Claims, 5 Drawing Sheets

WHEELCHAIR RECLINING APPARATUS

FIELD OF THE INVENTION

This invention relates to an apparatus and method for supporting the back of a wheelchair having a person siting in the wheelchair, when the wheelchair is tilted backwards. The apparatus consists of a base, stand, and crossbar for engaging the frame of the wheelchair. A headrest of back rest may be provided to support the wheelchair occupant's head. The frame of the wheelchair is supported near its handles by the crossbar of the invention, allowing some mobility in the wheelchair resting on the invention.

DESCRIPTION OF THE PRIOR ART

It is often necessary to recline people in wheelchairs. Many products are on the market to tilt wheelchairs with expensive, large, often motorized, tilting devices.

U.S. Pat. No. 4,527,944 to Qually et al. discloses tilting device which picks up the entire wheelchair.

U.S. Pat. No. 4,561,823 issued to Norton shows a similar tilting device which picks up the wheelchair, however it collapses for storage.

U.S. Pat. No. 4,834,411 to Willey, et al. shows a tilting device for shampooing wheelchair occupants.

U.S. Pat. No. 5,007,118 issued to Ebersole discloses a head care station which extends outward to engage and pick up the front wheels of a wheelchair for shampooing the occupant.

U.S. Pat. No. 5,044,647 issued to Patterson, and U.S. Pat. No. 5,865,504 issued to Warhaftig U.S. Pat. No. 5,421,693 to Peterson shows a motorized frame that tilts a wheelchair.

SUMMARY OF THE INVENTION

The present invention provides an apparatus for supporting a wheelchair in a reclined position. When wheelchair occupants need dental care, their hair shampooed, or have other reasons of therapy or comfort requiring a reclined position, it is difficult to place the wheelchair in the proper position. Typically, the person moves from the wheelchair into a suitable chair or placement.

Wheelchairs designed to recline offer similar benefits to the present invention, however, if the occupant has a standard manual wheelchair, it is necessary for them to switch to the reclining chair, if available. If the person can move to a reclining wheelchair, it would be just as easy to move to a dentist's chair or shampoo chair. The present invention allows the occupant to remain in the wheelchair, without changing chairs, which can be difficult, dangerous, and often uncomfortable to the occupant. When in the reclined position, the wheelchair and support apparatus may be moved together to position the wheelchair.

The invention allows nursing homes to have inexpensive means of reclining wheelchairs, with no need for special staff training in the use of the equipment. It can be used for dental examinations, and other routine dental care. Hair care and shampooing, reclining, and exercising or physical therapy, are other uses where it is beneficial to have the occupant of the wheelchair in a reclining position.

Many elderly nursing home patients spend long hours in a wheelchair. This will allow them more flexibility to do things without getting out of the wheelchair, yet also allows a different position to redistribute the person's body weight. Wheelchairs tend to force the occupants forward, often leading to a slumped forward, kyphotic condition.

It is therefore an object of the present invention to provide a new, simple wheelchair tilting device that can be used inexpensively. It is a further object of the present invention to allow a person in a wheelchair to be securely positioned for dental examination, or shampooing, without removing the person from the wheelchair. It is still a further object of the invention to provide a wheelchair tilting device which is portable and reliable.

REFERENCE NUMERALS IN THE DRAWINGS

Figure 1:
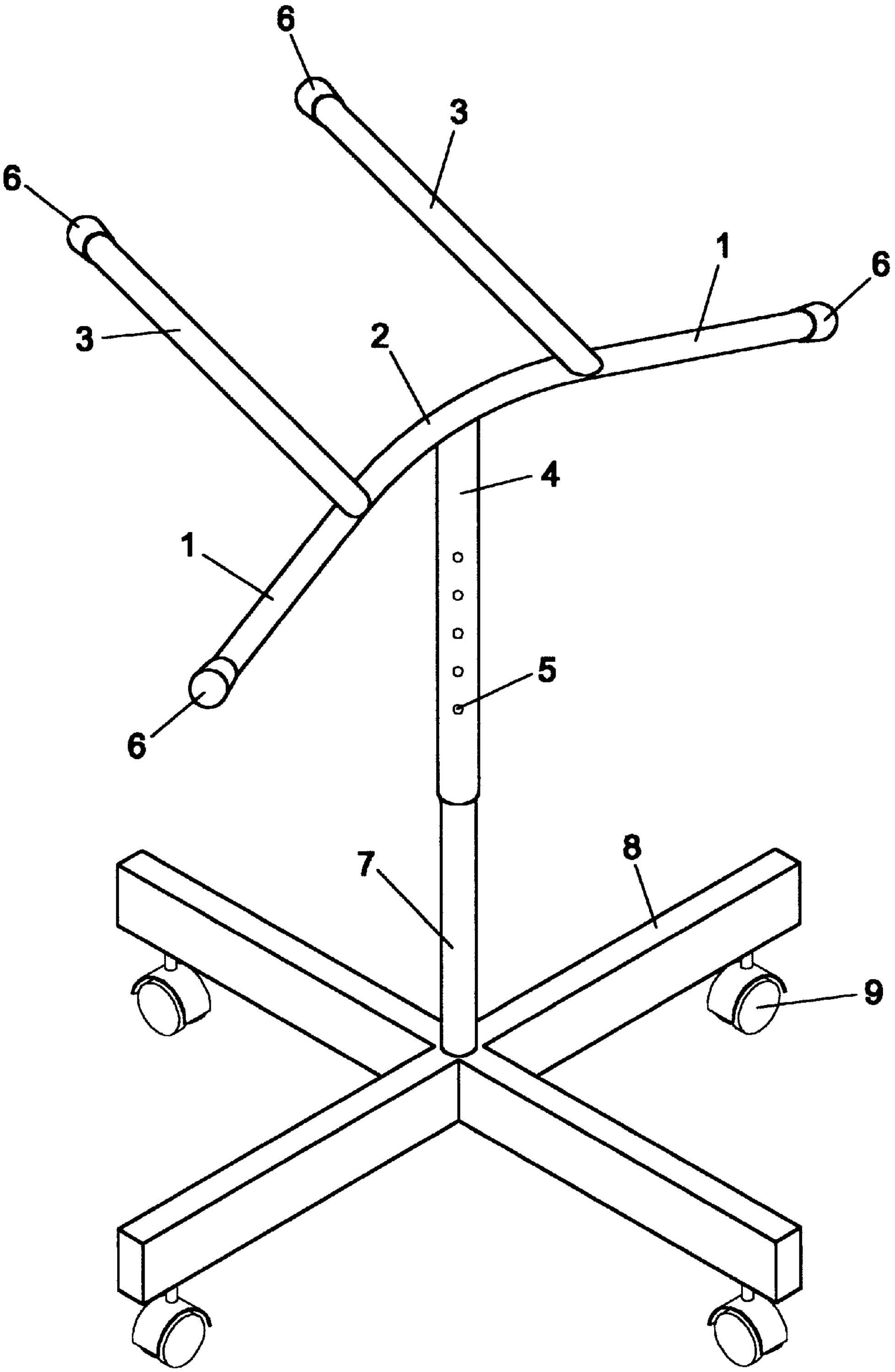
FIG. 1 is a drawing of a front view of an embodiment of the invention
Figure 2:
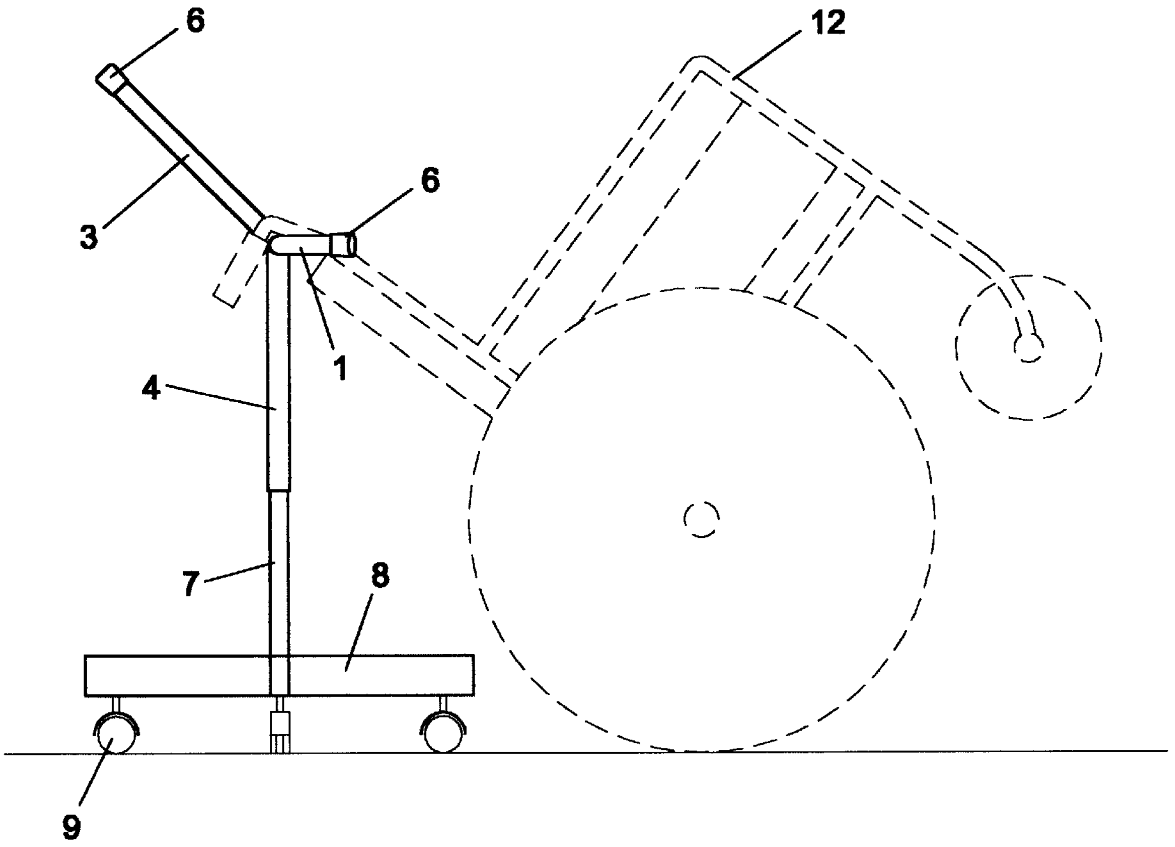
FIG. 2 is a drawing of a side view of an embodiment of the invention with a wheelchair

1. Chair engaging section of the crossbar
2. Recessed area of the crossbar
3. Upright
4. Frame
5. Adjusting Holes
6. End cap
7. Stand
8. Base
9. Caster wheel
10. Headrest
11. Leg pad
12. Wheel chair

DETAILED DESCRIPTION OF THE PREFERRED EMBODIMENT

The invention is shown in FIG. 1 in a preferred embodiment. A main frame 4 of the invention consists of a tubular member. The frame 4 is fit over the outside diameter of the tubular member of the stand 7. Horizontal adjusting holes 5 are placed incrementally along the frame 4 and stand 7. This allows for adjustment of the height of the frame 4 by insertion of a cotter pin through the aligned holes of the frame 4 and stand 7. The stand 7 is welded, or fixed, to a base 8 to support the invention. It is beneficial to have caster wheels 9 on the bottom of the base 8 to allow the invention to roll. This also allows the combination of the wheelchair and support apparatus to roll together.

The top of the frame 4 is attached to a crossbar 1, 2. The recessed area of the crossbar 2 is relatively straight at its center, at the junction with the frame 4. The recessed area of the crossbar 2 is concave to the front of the invention. The chair engaging section of the crossbar 1 is a relatively straight section of tubular material to allow for various wheelchair widths. The crossbar may also be a straight tubular member. It is also possible to have straps to secure the wheelchair frame to the crossbar 1. Hook and loop fasteners, bungee-type cords, or similar means could be used to attach the wheelchair to the invention.

A wheelchair, with the occupant in it, is backed toward the front of the invention. The wheelchair is then tilted manually by a nurse, aide, or assistant, until the frame portion of the wheelchair at the bend for the handles of the wheelchair come to rest on the chair engaging section of the crossbar 1.

Figure 3:
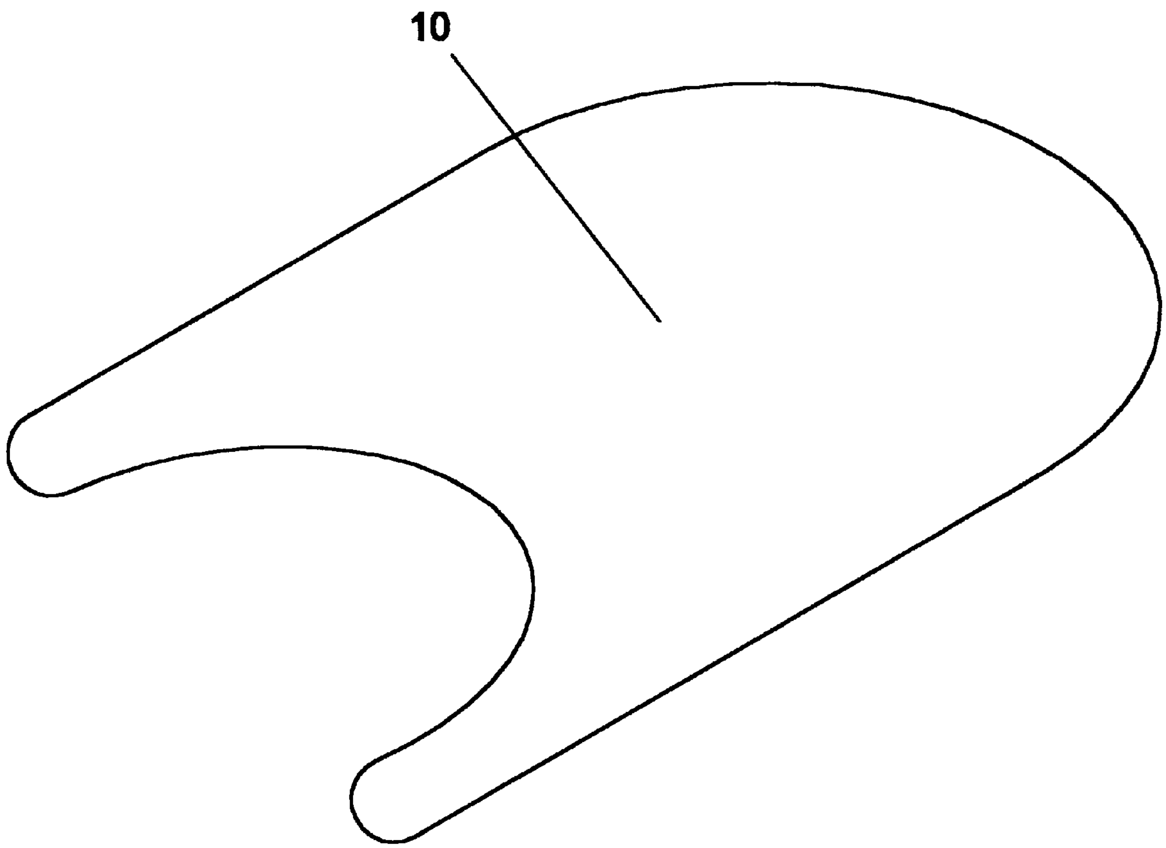
FIG. 3 is a detail of a headrest of neck support
Figure 4:
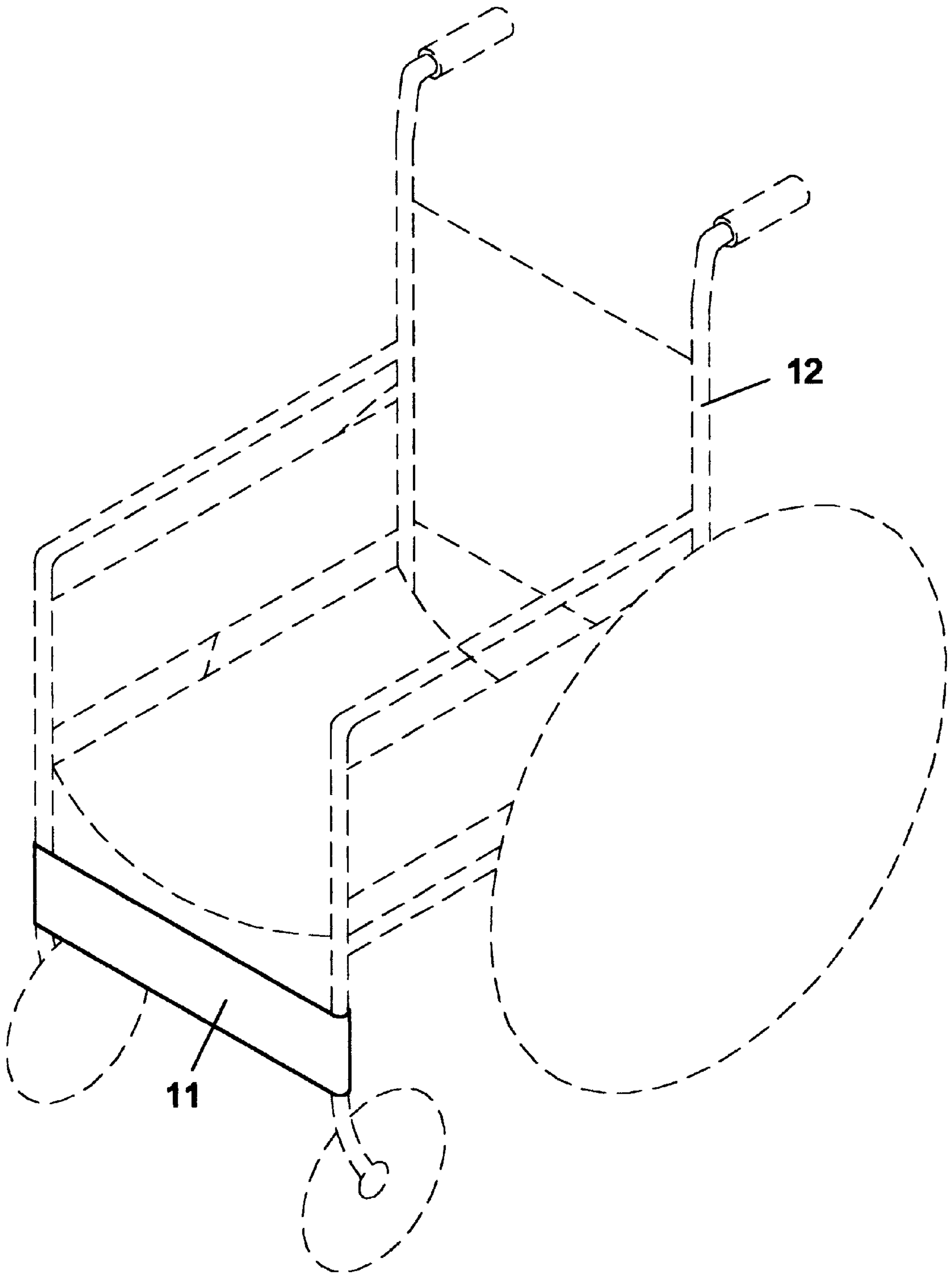
FIG. 4 is a detail of a leg pad to support the occupant's legs in a reclined position
Figure 5:
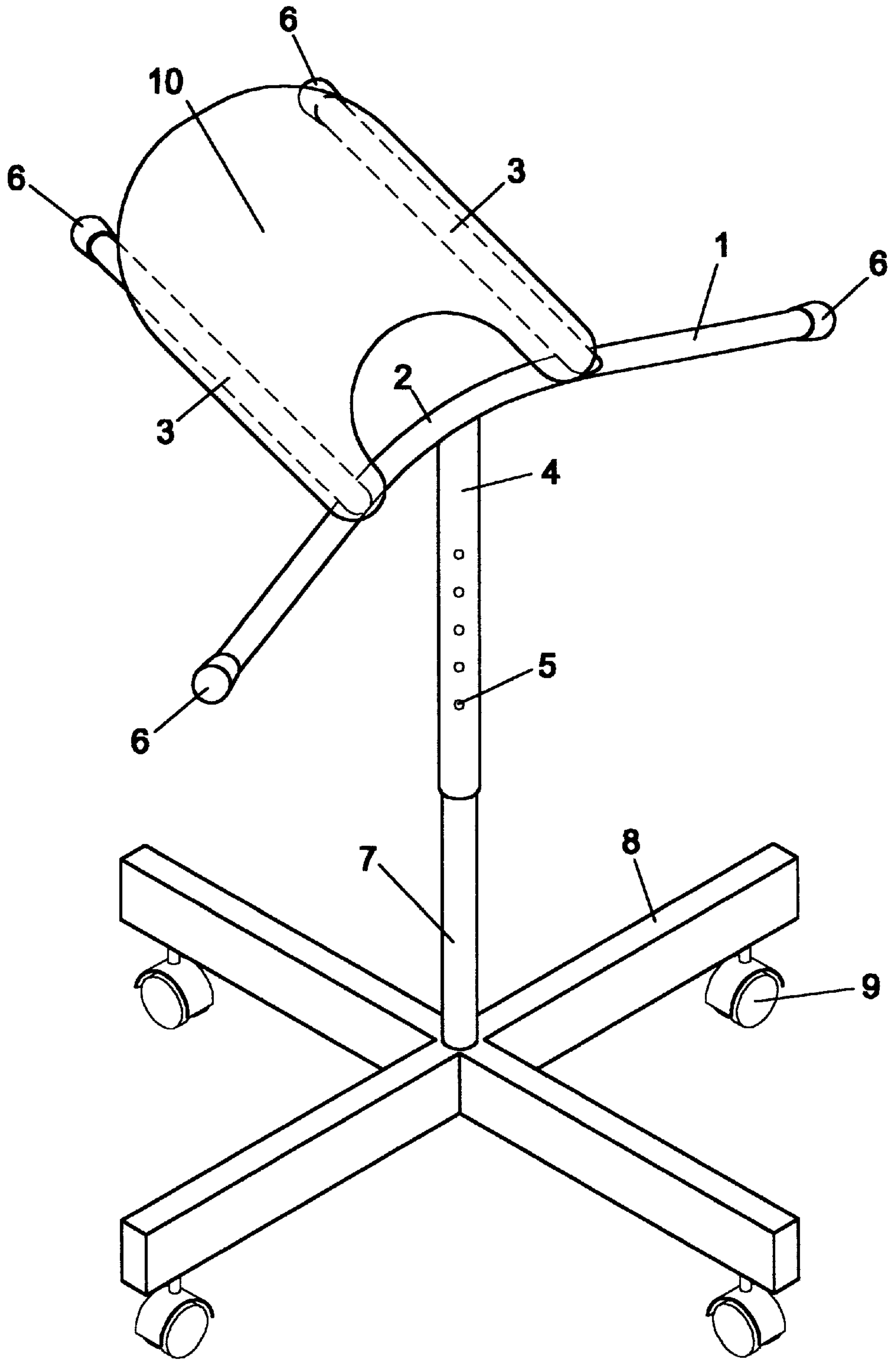
FIG. 5 is a drawing of an embodiment of the invention with the headrest attached.

To allow for support of the head of the occupant, uprights 3 may be attached to the recessed area of the crossbar 2. A headrest 10 may be attached to the uprights 3 or attached with clips. Various headrests 10 may be utilized for different uses, such as a flat, padded piece for dentistry, a curved neck rest to allow for shampooing, or a pillow-like support for casual reclining. As shown in FIG. 3, a single headrest 10 may be reversible to provide head support,, or reversed to allow neck support for hair shampooing.

Hydraulics or springs may be used in the connection between the frame 4 and stand 7 to provide a cushioned movement of the sliding of the two tubular members. This may reduce the jolt of the wheelchair coming to rest on the invention.

For wheelchairs which do not have foot rests, or when desirable, it is also possible to provide a leg rest 11. This would support the occupant's legs in a reclined position, giving a more comfortable and secure position.

I claim:

1. For a wheelchair having a front section and rear section and having rearwardly extending means for pushing the wheelchair, an apparatus for holding the wheelchair in a rearwardly reclined position, the apparatus having top, bottom, front, and rear sections, and comprising:

a) a base at the bottom of the apparatus and adapted to rest on a substantially flat, horizontal surface;

b) an upright frame adjustably coupled to and extending upwardly from the center of the base, the frame being perpendicular to the surface;

c) a crossbar centrally coupled to the top of the upright frame, the crossbar having a rearwardly recessed central portion, the crossbar having left and right ends extending from left and right sides of the central portion, the left and right ends of the crossbar being tilted upwardly and forwardly from the upright frame; and d) left and right means for engaging the wheelchair, the left means for engaging the wheelchair extending laterally from the left end of the crossbar, the right means for engaging the wheelchair extending laterally from the right end of the crossbar, such that the left and right chair engaging members extend at least 16 inches apart whereby the left and right means for engaging the wheelchair are adapted to engage the rearwardly extending means for pushing the wheelchair when the wheelchair is rearwardlv reclined against the apparatus, thus holding the wheelchair in a rearwardly reclined position.

2. For a wheelchair having uprights and handles, the handles extending rearwardly from the uprights such that junctions exist between the handles and uprights, an apparatus for supporting the wheelchair in a rearwardly reclined position, the apparatus having top, bottom, front, and rear sections, and comprising:

a) a base, at the bottom of the apparatus and adapted to rest on a substantially flat horizontal surface;

b) a frame, the frame being coupled to the base and extending upwardly from the base; and c) left and right chair engaging members coupled to the frame, each of the left and right chair engaging means extending laterally out from the sides of the frame in substantially opposing directions, such that the left and right chair engaging members extend at least 16 inches apart, whereby the left and right chair engaging members are adapted to engage the junctions of the wheelchair for supporting the rearwardly reclined wheelchair.

3. The apparatus of claim 2, wherein the left and right chair engaging members are adapted to substantially perpendicularly engage the left and right junctions between the uprights and handles of the wheelchair.

4. The apparatus of claim 3, further comprising a crossbar coupled to the frame, the crossbar having left and right ends, the crossbar having a rearwardly recessed central portion between the left and right ends.

5. The apparatus of claim 4, wherein the left chair engaging member is connected to the left end of the crossbar, and the right chair engaging member is connected to the right end of the crossbar.

6. The apparatus of claim 5, wherein the left and right chair engaging members comprise substantially straight tubular members.

7. The apparatus of claim 2, wherein the frame is vertically adjustably coupled to the base.

8. The apparatus of claim 2, further comprising means for rolling coupled to the base whereby the base may roll upon the surface.

9. The apparatus of claim 4, further comprising a pair of upright members extending upwardly and rearwardly from the crossbar adapted for supporting the head of a patient seated in the wheelchair.

10. The apparatus of claim 2, further comprising a headrest coupled to the frame adapted for supporting the head of a patient seated in the wheelchair.

11. A method of supporting a wheelchair having uprights and handles. the handles extending rearwardly from the uprights forming left and right junctions, in a rearwardly reclined position, the method comprising the steps of:

a) using an apparatus having a frame to support left and right chair engaging members;

b) backing the wheelchair towards the chair engaging members; and c) rearwardly tilting the wheelchair towards the chair engaging members until the left and right chair engaging members substantially perpendicularly engage the left and right junctions such that the wheelchair is supported by the apparatus.

* * * * *